Feb. 7, 1967 H. NITSCH 3,303,216
METHOD OF PRODUCING CYCLOALKANONE OXIMES
Filed Sept. 17, 1963
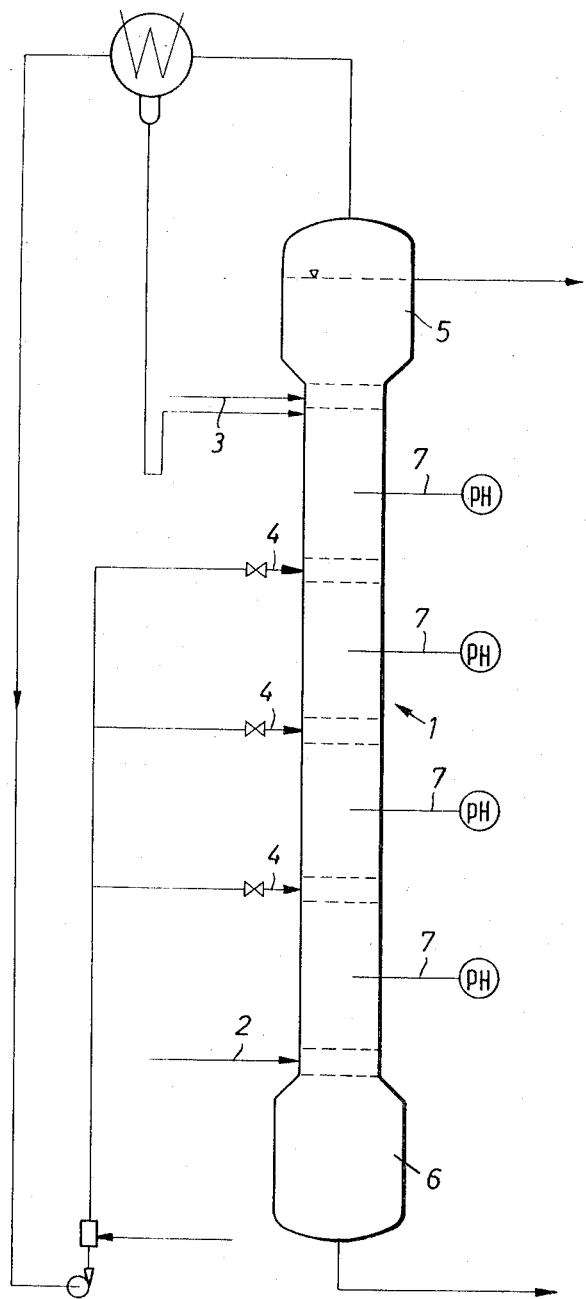
INVENTOR
HELMUT NITSCH
BY
Agent 3,303,216
METHOD OF PRODUCING CYCLOALKANONE OXIMES
Helmut Nitsch, Heusenstamm, Germany, assignor, by mesne assignments, to Vickers-Zimmer Aktiengesellschaft, Planung und Bau von Industrieanlagen, Frankfurt am Main, Germany, a corporation of Germany
Filed Sept. 17, 1963, Ser. No. 309,535
Claims priority, application Germany, Sept. 29, 1962, Z 9,692
9 Claims. (Cl. 260—566)

This invention relates to a mehod or producing cycloalkanone oximes which are difficultly soluble or insoluble in water.

It is known that cycloalkanone oximes can be produced from the corresponding cycloalkanones by reaction with an aqueous acidic hydroxylamine salt solution. Oximes are needed industrially in large quantities, the best known representative of this group of compounds being cyclohexanone oxime, an intermediate product in the synthesis of ε-caprolactam.

In previously proposed methods of oximation at elevated temperature, the oxime is obtained in liquid form, and the reaction is performed in one or more stirring vessels operating in tandem, depending upon the procedures selected, i.e. whether a discontinuous or a continuous process is desired. In the continuous process the application of the counterflow principle is preferred because the yields are then better. A two-stage method of oximation has also been proposed in which a considerable excess of hydroxylamine is used in a first reaction stage and a corresponding cycloalkanone excess in a second reaction stage. After each reaction stage the acid liberated from the hydroxylamine salt is neutralized and the organic phase is separated from the inorganic phase. In this method, the reaction temperature is the melting point temperature of the water-containing cycloalkanone oxime and may exceed said temperature by up to 20° C. above the same. In the two reaction stages, the pH is between 2 and 3 and in the following neutralization stage it is increased to a pH between 5 and 7.

These methods suffer from a number of disadvantages which are of a particular disadvantage in the course of a lactam synthesis when the production of a cycloalkanone oxime, such as cyclohexanone oxime, of high purity is required. Even when the hydroxylamine excess is relatively high a residual content of about 0.5 to 2% of cyclohexanone remains in the cycloalkanone oxime produced by the previously proposed method, this being due to the Gaussian distribution curve in stirring vessels and the unfavourable hydrolysis equilibrium at a pH of 2 to 3. This unreacted portion causes formation of by-products in the following Beckmann conversion and these cannot be removed in the further purification stages without a good deal of trouble. Since hydroxylamine is a very expensive raw material, the reaction in the case of a low molar hydroxylamine excess must be performed in at least two stages which necessitate the provision of a considerable amount of apparatus.

It has now been found that these drawbacks do not arise if the counterflow reaction is performed in a column and if the acid which is liberated during oximation is simultaneously neutralized by the addition of a mixture of ammonia and an inert gas. Accordingly the present invention provides a method of producing a cycloalkanone oxime which is difficultly soluble or insoluble in water from the corresponding cycloalkanone and an aqueous acidic solution of a hydroxylamine salt at a temperature above the melting point of the oxime. According to said method the cycloalkanone is introduced into the bottom part of a reaction column, whereas the hydroxylamine salt solution is introduced at the top of the column, the reactants flowing counter-current to one another so that the oxime is recovered from the top of the column, and wherein a mixture of ammonia and an inert gas is admitted at several points at different levels of the column.

With this method, the production of cycloalkanone oximes which are difficultly soluble or insoluble in water is thus greatly facilitated and at the same time the quality of the final product as well as the yields based on hydroxylamine and cycloalkanone charged are greatly improved, while less costly apparatus is needed.

In order to enable the invention to be more readily understood, reference will now be made to the accompanying drawing, which illustrates diagrammatically and by way of example an apparatus for carrying out the method of the present invention.

Referring now to the drawing, the reactants employed in the present method, namely a cycloalkanone and an aqueous solution of a hydroxylamine salt are introduced in counterflow into packed column 1, the top and bottom of the column being enlarged and constructed to function as separating vessels 5 and 6. The solution of the hydroxylamine salt which may be sulfate and which is the heavier reactant, is introduced below the upper separating zone through inlet 3, whereas the lighter organic reactant, which may be cyclohexanone, is introduced above the lower separating zone through inlet 2. In view of the application of the counterflow principle a maximum excess of one of the two reaction components which becomes infinity in the head and foot of the column will be present at any level between the two inlets for the reactants if the reactants are introduced in stoichiometric proportions. At two or more points 4 between the two product inlets 2 and 3, a mixture of ammonia and an inert gas is simultaneously introduced into the column.

The ammonia neutralizes the acid liberated during oximation and permits adjustment to the optimum pH value along the reaction path, a feature which is not available in the previously proposed method. It has been found to be of advantage to adjust the pH in the column so as to rise as uniformly as possible from a pH of 2 at the head to a pH of 7 in the sump of the column, preferably from a pH of 3.5 to a pH of 6.5. This can easily be done by suitably metering admission of the mixture of ammonia and inert gas at the several entry points 4. The required concentration of ammonia in the inert gas is generally between 3% and 60%, preferably between 5% and 40%, by volume, of ammonia. The admixture of inert gas ideally fulfills the following functions:

(a) A kind of eddy current is generated inside the column which assures intimate mixture of the reactants, (b) The dilution of the gaseous ammonia with the inert gas prevents formation of basically reacting zones in the column which might lead to the dissociation of the hydroxylamine salt, and (c) According to pressure and temperature, the inert gas becomes charged with water vapor and thereby extracts the heat of reaction and neutralization.

The inert gas, substantially free from ammonia, is withdrawn from the head of the column, cooled, compressed and reintroduced into the column in mixture with fresh ammonia.

Liquid cycloalkanone oxime, being the lighter phase, is withdrawn from the separating zone 5 at the head of the column, whereas the heavier aqueous ammonium sulfate solution flows out through a syphon from the separating zone 6 in the sump of the column.

When performing the present method, a molar hydroxylamine excess of 1% to 5% permits preparation of a cycloalkanone oxime which contains no detectable trace of cycloalkanone.

The invention will now be further illustrated by the following examples:

*Example 1*

1.74 kg. of cyclohexanone, 15.8 kg. of an aqueous solution of hydroxylamine sulfate containing 127 g./l. of hydroxylamine sulfate, 250 g. of ammonium sulfate and 10 g./l. of ammonium nitrate, providing a 5% molar hydroxylamine excess and a pH of 5.9, are introduced continuously per hour into the packed reaction column shown in the drawing. At the same time a mixture of ammonia and nitrogen containing 15% to 25%, by volume, of ammonia is introduced into the column at three different levels 4, the ammonia concentration being adjusted so as to maintain a temperature of 75° C. to 80° C. inside the column. The gas volumes at the admission points are so determined that the uppermost of a series of pH meters 7 registers a pH between 3.3 and 3.5, the middle ones register a pH between 4 and 4.5 and the one at the bottom registers a pH between 5.5 and 6. 1.95 kg. of cyclohexanone oxime still containing 1% to 2% of water are then withdrawn per hour from the upper separating zone 5 and 15.7 kg. of ammonium sulfate solution from the bottom separating zone 6. The ammonium sulfate solution still contains about 1 g./l. of dissolved cyclohexanone oxime as well as 2 g. to 5 g./l. of unused hydroxylamine sulfate. The cyclohexanone oxime produced represents a yield of 98.2% calculated for the cyclohexanone introduced. Its quality is excellent and no traces of cyclohexanone in the product can be detected analytically.

*Example 2*

Under the same conditions as in Example 1, the cyclohexanone is replaced by 1.6 kg./h. of cyclopentanone for reaction with an aqueous hydroxylamine sulfate solution. In the presence of a molar excess of 4.3% of hydroxylamine, corresponding to 14.1 l./h. containing 127 g./l. of hydroxylamine sulfate, 1.85 kg. of cyclopentanone oxime are withdrawn from the reaction vessel per hour. Allowing for the loss of cyclopentanone oxime in the outflowing ammonium sulfate solution amounting to 1.3 g./l. the yield is 98.7% of the cyclopentanone introduced. The quality of the cyclopentanone oxime thus produced is excellent.

I claim:
1. In a process of producing a substantially cycloalkanone-free cycloalkanone oxime selected from the group consisting of cyclohexanone oxime and cyclopentanone oxime, the steps which comprise introducing a cycloalkanone selected from the group consisting of cyclohexanone and cyclopentanone into the lower part of a vertically extended reaction zone, causing said cycloalkanone to flow upwardly through said reaction zone, introducing an aqueous solution of a mineral acid addition salt of hydroxylamine into the upper part of said vertically extended reaction zone, causing said hydroxylamine salt solution to flow downwardly through said reaction zone countercurrently to the upwardly flowing cycloalkanone solution so as to effect intimate mixing of the two reactants, introducing a mixture of ammonia and an inert gas at different levels into the reaction zone so as to continuously neutralize the mineral acid set free during reaction, thereby maintaining the reaction temperature in the reaction zone at a temperature above the melting point of the resulting cycloalkanone oxime and the pH-value of the reaction mixture at a pH between about 2.0 in the upper part of the reaction zone and about 7.0 in its lower part and gradually increasing from said pH of 2.0 to said pH of 7.0 within the reaction zone, recovering the resulting substantially cycloalkanone-free cycloalkanone oxime from a separating zone provided above the upper part of the reaction zone and the ammonium salt solution formed during reaction from a separating zone provided below the lower part of the reaction zone.

2. The process according to claim 1, wherein the mixture of ammonia and inert gas contains between about 3%, by volume, and about 60%, by volume, of ammonia.

3. The process according to claim 1, wherein the mixture of ammonia and inert gas contains between about 5%, by volume, and about 40%, by volume, of ammonia.

4. The process according to claim 1, wherein the mixture of ammonia and inert gas is introduced into the reaction zone so as to cause substantially uniform decrease of the pH-value of the reaction mixture from the lower part of the reaction zone towards its upper part.

5. The process according to claim 1, wherein the pH-value of the reaction mixture in the reaction zone is maintained at a pH between about 3.5 in the upper part of the reaction zone and about 6.5 in its lower part.

6. The process according to claim 1, wherein the inert gas is recovered from the upper part of the reaction zone and, after reconstitution with ammonia, is recirculated into the reaction zone to neutralize the mineral acid set free during reaction.

7. The process according to claim 1, wherein the mineral acid addition salt of hydroxylamine is hydroxylamine sulfate.

8. In a process of producing a substantially cycloalkanone-free cyclohexanone oxime, the steps which comprise introducing cyclohexanone into the lower part of a vertically extended reaction zone, causing said cyclohexanone to flow upwardly through said reaction zone, introducing an aqueous solution of a mineral acid addition salt of hydroxylamine into the upper part of said vertically extended reaction zone, causing said hydroxylamine salt solution to flow downwardly through said reaction zone, countercurrently to the upwardly flowing cyclohexanone solution so as to effect intimate mixing of the two reactants, introducing a mixture of ammonia and an inert gas at different levels into the reaction zone so as to continuously neutralize the mineral acid set free during reaction, thereby maintaining the reaction temperature in the reaction zone at a temperature above the melting point of the resulting cyclohexanone oxime and the pH-value of the reaction mixture at a pH between about 2.0 in the upper part of the reaction zone and about 7.0 in its lower part and gradually increasing from said pH of 2.0 to said pH of 7.0 within the reaction zone, recovering the resulting substantially cyclohexanone-free cyclohexanone oxime from a separating zone provided above the upper part of the reaction zone and the ammonium salt solution formed during reaction from a separating zone provided below the lower part of the reaction zone.

9. In a process of producing substantially cyclopentanone-free cyclopentanone oxime, the steps which comprise introducing cyclopentanone into the lower part of a vertically extended reaction zone, causing said cyclopentanone to flow upwardly through said reaction zone, introducing an aqueous solution of a mineral acid addition salt of hydroxylamine into the upper part of said vertically extended reaction zone, causing said hydroxylamine salt solution to flow downwardly through said reaction zone countercurrently to the upwardly flowing cyclopentanone solution so as to effect intimate mixing of the two reactants, introducing a mixture of ammonia and inert gas at different levels into the reaction zone so as to continuously neutralize the mineral acid set free during reaction, thereby maintaining the reaction temperature in the reaction zone at a temperature above the melting point of the resulting cyclopentanone oxime and the pH-value of the reaction mixture at a pH between about 2.0 in the upper part of the reaction zone and about 7.0 in its lower part and gradually increasing from said pH of 2.0 to said pH of 7.0 within the reaction zone, recovering the resulting substantially cyclopentanone-free cyclopentanone oxime from a separating zone provided above the upper part of the reaction zone and the ammonium salt solution formed during reaction from a separating zone provided below the lower part of the reaction zone.

References Cited by the Examiner
UNITED STATES PATENTS 2,270,204   5/1942   Schlack _____ 260—566

FOREIGN PATENTS 4,783   6/1962   Japan.

CHARLES B. PARKER, *Primary Examiner.*

JOSEPH P. BRUST, R. V. HINES, *Examiners.*